SUPERCONDUCTIVE DEVICES

Filed Nov. 2, 1961 2 Sheets-Sheet 1

Inventor:
Paul S. Swartz,
by Paul R. Webb, II
His Attorney.

May 30, 1967 P. S. SWARTZ 3,323,089

SUPERCONDUCTIVE DEVICES

Filed Nov. 2, 1961 2 Sheets-Sheet 2

Inventor:
Paul S. Swartz,
by Paul R. Webb, II
His Attorney.

United States Patent Office 3,323,089

Patented May 30, 1967

3,323,089
SUPERCONDUCTIVE DEVICES

Paul S. Swartz, Schenectady, N.Y., assignor to General Electric Company, a corporation of New York Filed Nov. 2, 1961, Ser. No. 149,592
6 Claims. (Cl. 335—216)

This invention relates to superconductive devices and more particularly to high field superconductive devices for compressing a magnetic field confined within an aperture therein.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in generators, direct current motors and low frequency transformers, and to advances in cryogenics which removed many of the economic and scientific problems involved in extremely low temperature operations.

As is will known, superconduction is a term describing the type of electrical current conduction existing in certain materials cooled below a critical temperature, $T_c$, where resistance to the flow of current is essentially nonexistent. A high field superconductive body is a body with a superconducting phase which remains superconducting in a magnetic field greater than the critical magnetic field of that phase in homogeneous, unstrained bulk form.

The small amount of superconductive current and contemporaneous trapped magnetic flux which can be obtained within a superconducting body has been responsible to some degree for the lack of their use. The applied magnetic field to which a superconductive body is subjected begins to penetrate the skin or surface of the body and immediately creates a supercurrent which precludes the further penetration of the body. This is known as the Meissner effect. The London and verifying experiments demonstrated that an applied magnetic field induces theory envisioned currents to flow in a gross superconductor which decrease in magnitude from the outside toward the inside of the body. The result has been that the flux penetration depth and the depth to which the induced superconducting currents flow in a given superconductive material is given in terms of the London penetration depth $\lambda$. However, since the penetration depth $\lambda$ is exceedingly small, for example, less than about 1000 A. in most materials, it has not been possible to increase the quantity of penetrating magnetic flux in gross superconducting bodies. An increase in the magnitude of the applied magnetic field does not extend the limit, since this limit is fixed at the critical field, $H_c$, which results in the creation of a critical current density, $J_c$, in the surface of the superconductor and drives it normally resistive, or non-superconducting.

It has been found that high field superconductive bodies possess higher critical fields, $H_c$, than homogenous, unstrained bulk superconductive bodies and available evidence increasingly supports the proposition that the higher critical fields, and therefore higher current densities, are manifestations of the microstructure in hard superconductive bodies. Specifically, the magnetic properties of high field superconductors are felt to inhere from what may be described as a fine filamentary mesh which pervades the bodies. Such a mesh provides connectivity that has an extremely high multiplicity. It has been shown that filaments which are thinner than the penetration depth in a gross superconductive body will remain superconductive in the presence of externally applied magnetic fields which exceeds the critical field of the gross superconductive body. The filamentary mesh provides a plurality of current paths which enable larger currents to flow losslessly in the bodies and raise the critical current density, $J_c$.

It would be desirable to provide a high field superconductive device for compressing a magnetic field confined within an aperture in the device.

It is an object of my invention to provide a high field superconductive device.

It is a further object of my invention to provide a high field superconductive device for compressing a magnetic field confined within an aperture in the device, thereby increasing the magnetic field strength thereof.

In carrying out my invention in one form, a high field superconductive device comprises a solid high field superconductive body having an aperture therethrough, means to produce a magnetic field generally parallel to the axis of the aperture within the aperture of the body, means to maintain the temperature of the body below its critical temperature, and means for compressing the magnetic field.

These and various other objects, features, and advantages of the invention will be better understood from the following description taken in connection with the accompanying drawing in which.

Figures 1, 2, 3, 4, 5, 6, 7, 8:
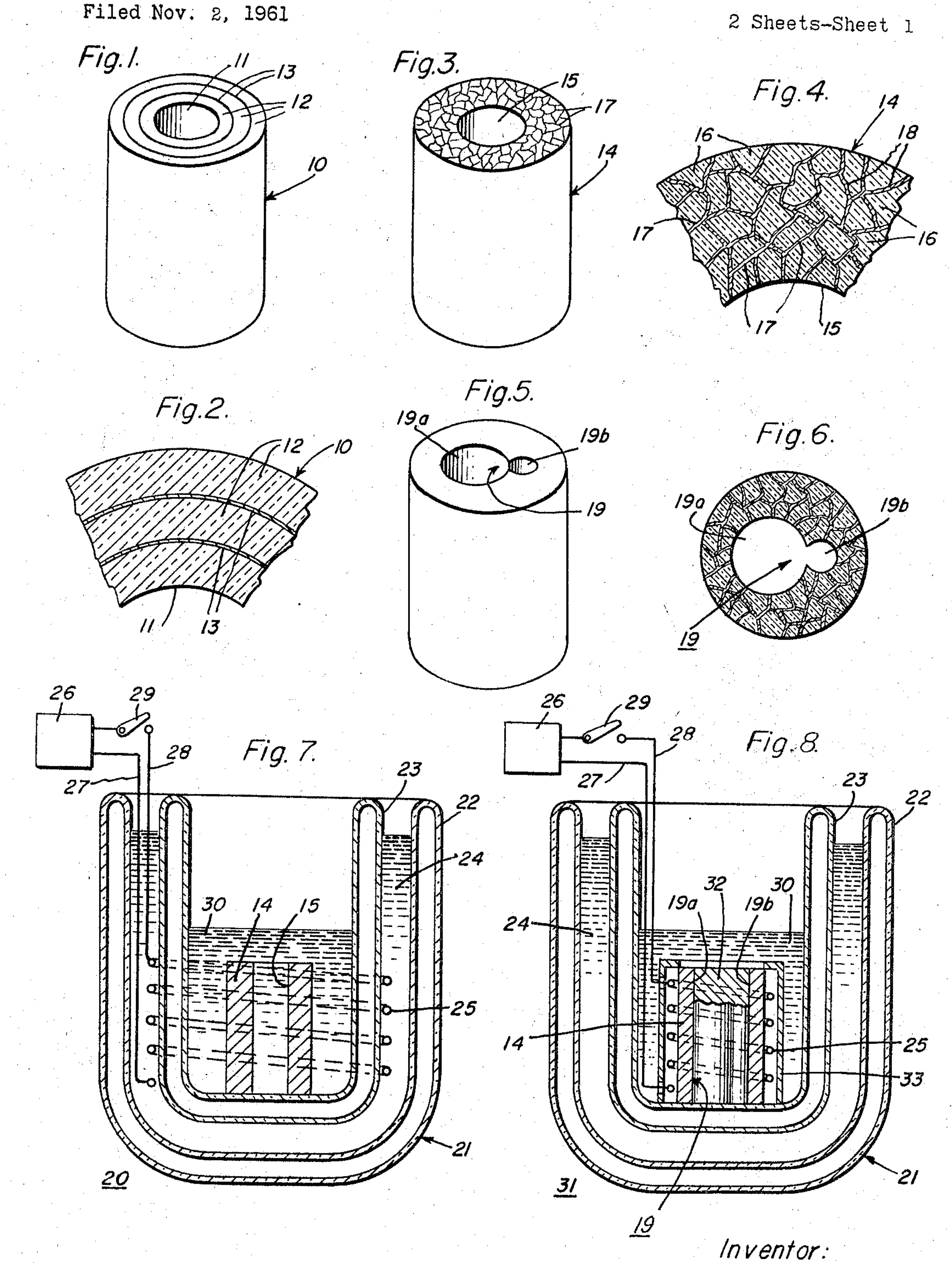
FIGURE 1 is a perspective view of a solid high field superconductive body.
FIGURE 2 is a fragmentary, transverse sectional view of the body shown in FIGURE 1.
FIGURE 3 is a perspective view of another solid high field superconductive body including superconductive filaments.
FIGURE 4 is a fragmentary, transverse sectional view of the body shown in FIGURE 3.
FIGURE 5 is a perspective view of a modified solid high field superconductive body.
FIGURE 6 is a sectional view taken on line 6—6 of the body shown in FIGURE 5.
FIGURE 7 is a sectional view of apparatus for providing a high field superconductive device embodying my invention.
FIGURE 8 is a sectional view of a modified apparatus.

In FIGURES 1 and 2 of the drawing, a solid high field superconductive body 10 is shown having a central aperture 11 therethrough. Body 10 comprises a plurality of non-superconductive layers 12 between which are positioned thin, continuous films 13 of a superconductive metal or alloy. For example, layers 12 are ceramic material while films 13 are tin. A thin film is defined as a film whose thickness, D, is less than the superconducting penetration depth, $\lambda$.

In FIGURES 3 and 4 of the drawing, a solid high field superconductive body 14 is shown having a central aperture 15 therethrough. For example, a superconductive matrix 16 has a filamentary network 17 filled with a superconductive material 18. Additionally, such a high field superconductive body can comprise a non-superconducting metallic or porous ceramic matrix with a filamentary network of a superconductive material therein. For example, mercury can be employed in the filamentary network of a porous ceramic matrix.

FIGURES 5 and 6 disclose a further modified solid high field superconductive body similar to the body disclosed in FIGURE 3 but including an aperture 19 in the form of a figure 8 extending through the body.

In FIGURE 7 apparatus is shown generally at 20 for producing a high field superconductive device embodying my invention which comprises an insulated container 21 having an outer insulated vessel 22 and an inner insulated vessel 23 separated by liquid nitrogen 24. For example, a high field superconductive body 14 consisting of consolidated columbium and tin powders to form a continuous filamentary network of $Cb_3Sn$ partially reacted and having an aperture 15 therethrough of the type shown in FIGURE 3 of the drawing is positioned within inner insulated vessel 23 and on the bottom thereof. A solenoid 25 surrounds the exterior wall of body 14 and is connected to a power source 26 by means of leads 27 and 28. A switch 29 is provided in lead 28 between solenoid 25 and power source 26 to energize and de-energize solenoid 25 to provide a magnetic field generally parallel to the axis of aperture 15 or at a slight angle thereto and within body 14 and aperture 15. Liquid helium 30 is poured into vessel 23 to immerse body 14 to cool the body below its critical temperature, $T_c$. If desired, solenoid 25 can be made of a superconductive material and positioned directly in liquid helium 30 to surround body 14.

In FIGURE 8 of the drawing, a modified apparatus 31 is shown for producing a high field superconductive device embodying my invention which comprises an insulated container 21 having an outer insulated vessel 22 and an inner insulated vessel 23 separated by liquid nitrogen 24. For example, a high field superconductive body or tube 14 having a figure 8 aperture 19 therethrough of the type shown in FIGURES 5 and 6 of the drawing is positioned within inner vessel 23 and on the bottom thereof. A solenoid 25 of superconducting material surrounds the exterior wall of body 14 and is connected to a power source 26 by means of leads 27 and 28. A magnetic core 32, such as soft iron, of figure 8 configuration is positioned in aperture 19. A switch 29 is provided in lead 28 between solenoid 25 and power source 26 to energize and de-energize solenoid 25 to provide a magnetic field and thereby magnetize core 32 within aperture 19 which is parallel to the axis of the aperture. A magnetic housing 33, such as soft iron, surrounds solenoid 25. Magnetic flux lines pass through housing 33 from the North pole to the South pole of core 32. Liquid helium 30 is poured into vessel 23 to immerse body 14, solenoid 25, core 32 and housing 33 therein to cool body 14 below its critical temperature.

In the operation of the apparatus shown in FIGURE 7, a superconductive body 14 having an aperture 15 therethrough is positioned within inner insulated vessel 23 of insulated container 21. Solenoid 25 is positioned in vessel 22 in liquid nitrogen 24 to surround body 14. Switch 29 is closed to energize solenoid 25 to produce a magnetic field generally parallel to the axis of aperture 15 and within both body 14 and its aperture 15.

Liquid helium 30 is poured into vessel 23 to contact body 14 to cool the body from above to below its critical temperature, $T_c$. As body 14 is cooled below its critical temperature the body becomes superconducting. When body 14 has become completely superconductive, the magnetic field which is parallel to the axis of the aperture is confined substantially therein. Switch 29 is then opened to de-energize solenoid 25 whereupon the applied magnetic field is terminated. The confined magnetic field within aperture 15 remains therein.

In the operation of the apparatus shown in FIGURE 8, a high field superconductive body having an aperture 19 therethrough is positioned within inner vessel 23 of insulated container 21. A solenoid 25 and a magnetic core 32 are employed to produce a magnetic field generally parallel to the axis of aperture 19 and in core 32 within this aperture. Switch 29 is closed to energize solenoid 25 to provide a magnetic field and thereby magnetize core 32. The magnetic flux lines from both fields are returned through outer magnetic housing 33. Liquid helium 30 is poured into vessel 23 to surround body 14. In this manner, the body is cooled below its critical temperature, $T_c$, to become superconducting. When the body has become completely superconductive, switch 29 is opened to de-energize solenoid 25. Magnetic core 32 is then removed slowly from aperture 19 while solenoid 25 and outer magnetic housing 33 can also be removed. The magnetic field parallel to the axis of the body aperture which was produced by solenoid 25 and core 32 is confined substantially within the aperture by superconductive body 14 maintained below its critical temperature.

Figure 9:
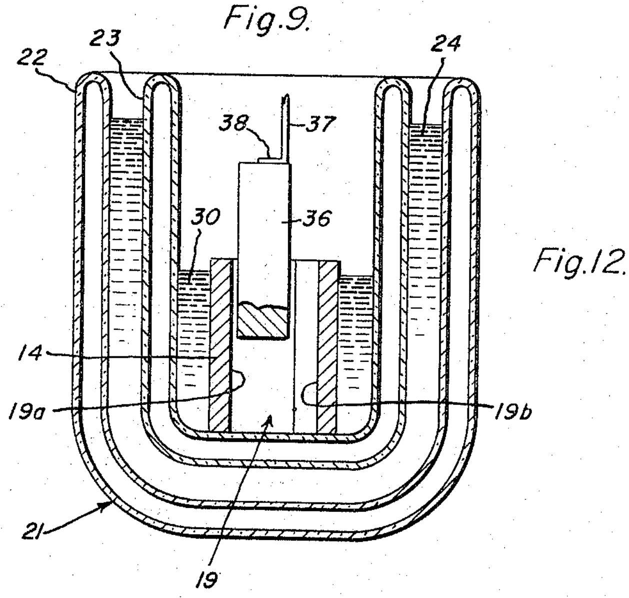
FIGURE 9 is a sectional view of a high field superconductive device embodying my invention.

In FIGURE 9, a high field superconductive device is shown which comprises an insulated container 21 having an outer insulated vessel 22 and an inner insulated vessel 23 separated by liquid nitrogen 24. For example, a solid high field superconductive body or tube 14 having a figure 8 aperture therethrough of the type shown in FIGURES 5 and 6 of the drawing is positioned within inner insulated vessel 23 and on the bottom thereof. This body has a magnetic field confined within its aperture 19 and generally parallel to the axis of the aperture. Such a high field superconductive body can be made in the apparatus of FIGURE 7 or 8. Liquid helium 30 surrounds the exterior wall of the body to maintain the temperature of the body below its critical temperature. A high field superconductive member in the form of a rod 36 is maintained below its critical temperature. Rod 36 which has a diameter less than the diameter of hole **19*a* of figure 8 aperture 19 is inserted into hole 19*a* by means of rod 37 and bracket 38 attached to rod 36. Such insertion can be manual or automatic. When member 36 is inserted into hole 19*a*, the confined magnetic field is compressed within aperture 19 to increase the magnitude of the field strength between rod 36 and the wall of hole 19*a* and within hole 19*b* thereby producing a compressed field, $H_{com}$. Since both rod 36** and the body are superconducting, they act to exclude the magnetic flux therefrom.

Figure 10:
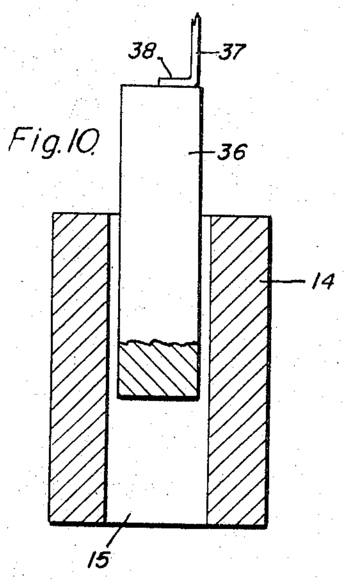
FIGURE 10 is a sectional view of a portion of modified high field superconductive device.
Figure 11:
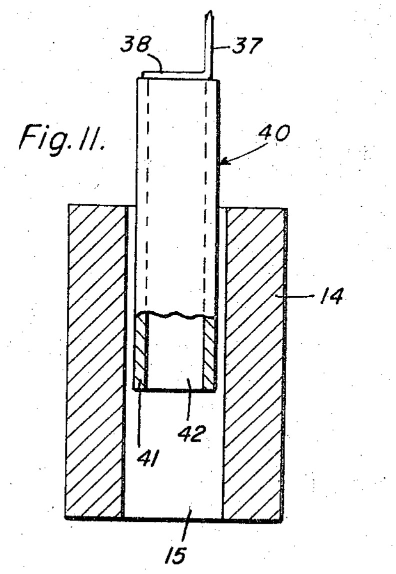
FIGURE 11 is a sectional view of a portion of a further modified high field superconductive device.
Figure 12:
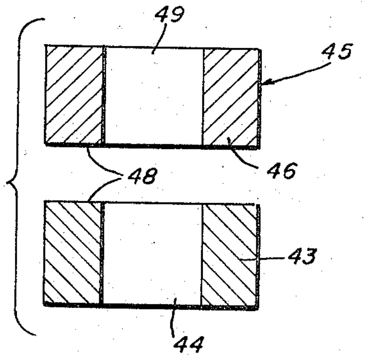
FIGURE 12 is a sectional view of a portion of a further modified superconductive device.

FIGURES 10, 11 and 12 show modified high field superconductive devices including a solid high field superconductive body 14 and means for compressing the magnetic field confined within the body aperture. Each of these bodies is positioned within an insulated container as shown in FIGURE 9. Additionally, liquid helium is in contact with the exterior wall of the body to maintain the body below its critical temperature whereby the body is superconducting. The insulated container and liquid helium have been omitted from these figures for simplicity.

FIGURE 10 discloses a solid high field superconductive body 14 of the type shown in FIGURE 3 with a magnetic field confined within its aperture 15. A high field superconductive member in the form of a rod 36, which is maintained below its critical temperature, is inserted, for example, by means of rod 37 and bracket 38 into aperture 15. The confined magnetic field is compressed between the rod and the aperture wall to increase the magnitude of the magnetic field strength.

FIGURE 11 discloses a solid high field superconductive body 14 with an aperture 15 therein confining a magnetic field. A high field superconductive member 40 is provided in the form of a tube 41 having a central aperture 42 therein. A magnetic field generally parallel to the axis of aperture 42 is confined within aperture 43 which field is in a reverse direction to the magnetic field in aperture 15. Member 40, which is maintained below its critical temperature, is inserted into aperture 15 of body 14 to compress the confined magnetic field in aperture 15 and the returning flux lines of member 40 between the outer wall of member 40 and the wall of aperture 15 to increase the magnitude of the magnetic field strength.

FIGURE 12 discloses a solid high field superconductive body in the form of a ring 43 within an aperture 44 therein confining a magnetic field. A superconductive member 45 in the form of a ring 46 with an aperture 49 therein confining a magnetic field generally parallel to the axis of the aperture and in reverse direction to the confined field in aperture 43. Member 45 is maintained below its critical temperature. Either member is moved toward the other member along a common axis or the members are moved toward each other to compress a magnetic field between their respective end walls 48.

Several examples of methods of producing solid high field superconducting devices in accordance with the present invention are as follows:

A solid high field superconductive body with a figure 8 apertude of the type shown in FIGURE 5 was produced by hydrostatically pressing columbium and tin powders with an atomic ratio of three columbium to one tin into a compact rod at a pressure of 100,000 pounds per square inch. The rod was sintered in vacuum at 850° C. for sixteen hours. After sintering, the rod was machine into a tube having a figure 8 aperture. The tube had an outside diameter of about one inch and a length of about 0.9 inch. The two holes of the figure 8 aperture were 0.500 inch diameter and 0.12 inch diameter, respectively. Apparatus of the type shown generally in FIGURES 7 and 9 was employed with the above high field superconductive body. Table I sets forth below the confined magnetic field strength produced in the aperture of the body by the solenoid and confined therein after the body has been cooled below its critical temperature by liquid helium. Table I sets forth further the compressed magnetic field strength after a high field superconductive rod maintained below its critical temperature is inserted into the larger diameter hole of the figure 8 aperture.

TABLE I

| Confined Field Strength (oersteds) | Compressed Field Strength (oersteds) |
|---|---|
| 455 | 2,960 |
| 1,115 | 5,580 |
| 1,555 | 7,340 |
| 1,560 | 7,440 |

The same high field superconductive body was employed in apparatus of the type shown generally in FIGURES 8 and 12. A magnetic housing surrounded the solenoid which was positioned adjacent the exterior wall of the high field superconductive body. Another magnetic core of figure-8 configuration was positioned within the figure-8 aperture of the body as shown in FIGURE 8. Table II sets forth below the confined magnetic field strength produced in the aperture by the solenoid and by the magnetic core and confined therein after the body has been cooled below its critical temperature by liquid helium and the core has been removed therefrom. Table II sets forth further the compressed magnetic field strength after a superconductive rod maintained below its critical temperature is inserted into the larger diameter hole of the figure-8 aperture.

TABLE II

| Confined Field Strength (oersteds) | Compressed Field Strength (oersteds) |
|---|---|
| 850 | 3,480 |

The same high field superconductive body was placed in an insulated container. A permanent magnet was positioned in the aperture of the body to produce a magnetic field therein generally parallel to the axis of the aperture and within the magnet. The body was then cooled by liquid helium to below its critical temperature. The magnet was then removed and the magnetic field was confined within the aperture. A high field superconductive rod as shown in FIGURE 12 was inserted into the aperture to compress the magnetic field between the rod and aperture wall. The confined magnetic field strength and compressed magnetic field strength are shown below in Table II.

TABLE III

| Confined Field Strength (oersteds) | Compressed Field Strength (oersteds) |
|---|---|
| 1,635 | 7,820 |
| 6,440 | 14,900 |

Another solid high field superconductive body was produced in the same manner as the previous body with the exception that the compact was sintered for two hours rather than 16 hours. Table IV sets forth the confined magnetic field strength produced in the aperture of the body by magnets as described previously. Examples 1, 2 and 3 employ a permanent magnet. Example 4 employs a permanent magnet and an associated curved magnetic body. Example 5 employs a fine particle magnet with an associated curved magnetic body. Table IV sets forth further the compressed magnetic field strength after a high strength superconductive rod maintained below its critical temperature is inserted into the larger diameter hole of the figure eight aperture.

TABLE IV

| Example | Initial Field Strength (oersteds) | Confined Field Strength (oersteds) |
|---|---|---|
| 1 | 490 | 2,875 |
| 2 | 1,645 | 6,030 |
| 3 | 1,970 | 7,690 |
| 4 | 1,785 | 6,400 |
| 5 | 2,880 | 9,160 |

In each of the above examples, the space between the superconductive rod and the aperture wall provides a region in which material can be placed before or after the magnetic field has been compressed to subject the material to this field. If it is desired, the material, for example, in the form of a body or gaseous plasma can be surrounded by a thermally insulated container within the compressed field so that the material can be subjected to a temperature different from the temperature of the superconductive body and controlled by external means.

While other modifications of this invention and variations in the method which may be employed within the scope of the invention have not been described, the invention is intended to include such that may be embraced within the following claims.

What I claim as new and desire to secure by Letters Patent of the United States is:

1. A high field superconductive device comprising a solid high field superconductive body having an aperture therethrough, means to produce a magnetic field generally parallel to the axis of said aperture within the aperture of said body, means to maintain the temperature of said body below its critical temperature, and means for compressing said magnetic field.

2. A high field superconductive device comprising an insulated container, a solid high field superconductive body positioned in said container, said body having an aperture therethrough, means to produce a magnetic field generally parallel to the axis of said aperture within the aperture of said body, a coolant within said container contacting the exterior wall of said body to maintain the temperature of said body below its critical temperature, and means for compressing said magnetic field.

3. A high field superconductive device comprising a solid high field superconductive body having a figure 8 aperture therethrough, means to produce a magnetic field generally parallel to the axis of said aperture within the aperture of said body, means to maintain the temperature of said body below its critical temperature, and a high field superconductive member maintained at a temperature below its critical temperature, the entire length of said member adapted to be inserted in a portion of the figure 8 aperture to compress said magnetic field in the other portion of said aperture.

4. A high field superconductive device comprising a solid high field superconductive body having an aperture therethrough, means to produce a magnetic field generally parallel to the axis of said aperture within the aperture of said body, means to maintain the temperature of said body below its critical temperature, a second solid high field superconductive body having an aperture therethrough maintained at a temperature below its critical temperature, means to produce a magnetic field generally parallel to the axis of the aperture of said second body substantially within said aperture and in a reverse direction to the first magnetic field in said first body, said second body adapted to be inserted into the aperture of said first body to compress the magnetic field in the aperture of said first body and the returning magnetic flux lines from the magnetic field of said second body.

5. A high field superconductive device comprising a solid high field superconductive body having an aperture therethrough, means to produce a magnetic field generally parallel to the axis of said aperture within the aperture of said body, means to maintain the temperature of said body below its critical temperature, a second solid high field superconductive body having an aperture therethrough maintained at a temperature below its critical temperature, means to produce a magnetic field generally parallel to the axis of the aperture of said second body substantially within said aperture and in a reverse direction to the magnetic field in said first body, and at least one of said bodies moveable toward the other of said bodies along a common axis to compress a magnetic field therebetween.

6. A high field superconductive device comprising a solid high field superconductive body having an aperture therethrough, means to produce a magnetic field generally parallel to the axis of said aperture within the aperture of said body, means to maintain the temperature of said body below its critical temperature, and a high field superconductive member maintained at a temperature below its critical temperature, said member adapted to be inserted into the aperture of said body to compress said magnetic field.

References Cited

UNITED STATES PATENTS 2,916,615 12/1959 Lundburg ---------- 340—173.1
2,946,030 7/1960 Slade -------------- 336—155

BERNARD A. GILHEANY, *Primary Examiner.*

J. BURNS, *Examiner.*

G. HARRIS, *Assistant Examiner.*